US008662484B2

(12) United States Patent
Valois

(10) Patent No.: US 8,662,484 B2
(45) Date of Patent: Mar. 4, 2014

(54) LINEAR FLEXURE BEARING

(76) Inventor: Michael Valois, Lancaster, MA (US)

(*) Notice: Subject to any disclaimer, the term of this patent is extended or adjusted under 35 U.S.C. 154(b) by 302 days.

(21) Appl. No.: 13/180,437

(22) Filed: Jul. 11, 2011

(65) Prior Publication Data

US 2013/0015616 A1 Jan. 17, 2013

(51) Int. Cl.
*F16B 43/00* (2006.01)

(52) U.S. Cl.
USPC .............................. 267/160; 411/534; 384/7

(58) Field of Classification Search
USPC .......... 267/158, 160; 403/119, 220, 291, 329; 411/534; 384/7
See application file for complete search history.

(56) References Cited

U.S. PATENT DOCUMENTS

| | | | | |
|---|---|---|---|---|
| 3,246,890 A | * | 4/1966 | Ormond | 267/138 |
| 3,527,062 A | * | 9/1970 | Bilinski et al. | 464/78 |
| 4,177,999 A | * | 12/1979 | Raber | 411/542 |
| 4,405,184 A | * | 9/1983 | Bahiman | 403/291 |
| 4,559,717 A | * | 12/1985 | Scire et al. | 33/568 |
| 5,492,313 A | * | 2/1996 | Pan et al. | 267/161 |
| 6,022,178 A | * | 2/2000 | Postma et al. | 411/534 |
| 7,249,923 B2 | * | 7/2007 | Niku | 411/383 |
| 7,354,033 B1 | * | 4/2008 | Murphey et al. | 267/160 |
| 2008/0292392 A1 | * | 11/2008 | Voellmer | 403/220 |
| 2012/0034027 A1 | * | 2/2012 | Valois | 403/291 |

* cited by examiner

*Primary Examiner* — Christopher Schwartz
(74) *Attorney, Agent, or Firm* — Lambert & Associates; Gary E. Lambert; David J. Connaughton, Jr.

(57) ABSTRACT

This compound linear flexure bearing incorporates a simple but unique flexure arrangement which inherently allows stable long travel operation. The flexure arrangement passively constrains all degrees of freedom except translation along the bearing axis while also compensating for flexure foreshortening. This design permits large displacement, low operating stress, low operating force, and high stiffness in the five noncompliant degrees of freedom. The linear flexure bearing described herein has applications in precision mechanics, particularly opto-mechanics. Specific applications include but are not limited to wafer and reticle positioning stages used in microlithography systems, optic translation and scanning mechanisms used in tactical and spaceborne systems, as well as flip-in mechanisms used in multiple field of view optical systems.

6 Claims, 12 Drawing Sheets

LINEAR FLEXURE BEARING

CROSS-REFERENCE TO RELATED APPLICATIONS

Not Applicable

FEDERALLY SPONSORED RESEARCH OR DEVELOPMENT

Not Applicable

REFERENCE TO SEQUENCE LISTING

Not Applicable

BACKGROUND OF THE INVENTION

This invention generally relates to a flexure based linear guide bearing. Flexures have been used successfully in motion systems for centuries. Since they operate by bending, not rolling or sliding, flexures have the inherent advantage of friction-free motion. This key feature allows engineers to build positioning systems with nearly unlimited precision and accuracy. They are also easily fabricated using readily available materials and common methods. However, even with these desirable attributes there are very few flexure based linear bearings available commercially. Therefore, it is common practice for an engineer to design custom flexure systems when developing a new mechanism. The linear flexure bearing described herein is particularly well suited for integration into precision motion systems and opto-mechanical mechanisms where friction-free motion over a limited range is required. It also has a configuration that scales easily without compromising the operating principle, making this concept a convenient basis for a family of linear flexure bearings. In addition to applications in precision mechanics, this bearing can be used in hostile operating conditions (extreme temperatures, extreme changes in temperature, vacuum, corrosive environment, contaminated environment . . . ) that normally prohibit use of conventional bushings, rolling element bearings, or gas lubricated bearings.

The current state of technology for flexure translation bearings is based on parallel planar flexures. A simple parallel flexure translation bearing at mid travel is shown in FIG. 2. It is composed of a fixed member 10 and an active member 20 connected by a pair of flexure members 30. When the active member is displaced in the + or −X direction it also moves in the −Y direction due to foreshortening of the flexure members when they bend as shown in FIG. 3.

A compound linear flexure bearing is formed when two simple parallel flexure translation bearings are assembled in series as shown in FIG. 4. One has the active member 40 and the other has the fixed member 50. They are connected by a common intermediate member 60. When a load is applied to the active member, the load path is from the active member through the first pair of flexure members, through the intermediate member, then through the second pair of flexure members and into the fixed member. If all four flexure members have the same stiffness and share the same dimensions, then they will experience the same Y foreshortening. The X deflection of each flexure member will be the same as the intermediate member which is half the active member X displacement. The rate of change and amount of Y foreshortening of the flexure member pair between the fixed member and intermediate member is identical to that of the flexure member pair between the intermediate member and active member. Since this flexure member Y foreshortening causes the intermediate member to move closer to the fixed member and the active member closer to the intermediate member, the net Y displacement of the active member is zero as shown in FIG. 5. It is desirable for the active member to maintain a constant Y position at all X positions, and this arrangement of two simple parallel flexure translation bearings makes it possible. However, the intermediate member is constrained in the X direction only by the stiffness of the flexure members. This means inertial loading, shock and vibrations, as well as active member accelerations during normal operation could excite the intermediate member causing it to oscillate after the active member has come to rest. FIG. 6 shows the intermediate member displaced while the active member is fixed at mid travel. The two simple parallel flexure translation bearings are shown operating in parallel rather than in series. Since the two simple parallel flexure translation bearings are allowed to simultaneously function in series and parallel, the location of the intermediate member can be difficult to determine. If the intermediate member oscillates on the flexure members after the active member has been moved to the desired position, the system may have stability issues.

The performance of a compound linear flexure bearing can be improved by regulating the position of the intermediate member with respect to the fixed and active ends. A lever arm 70 that is connected to a flexure pivot 80 on the fixed side and attached to both the active and intermediate members by flexure members 90 is typically used to control the intermediate member position as shown in FIG. 7. Since the lever arm positively locates the intermediate member, the two simple parallel flexure translation bearings will only operate in series as shown in FIG. 8. This version of the compound linear flexure bearing settles quickly and is not easily excited by external shock or vibration. Adding a lever arm to the compound linear flexure bearing improves stability, but comes with some tradeoffs. One is that the lever arm must be twice the length of the flexure members in the sub-stages so that the active member has a 2:1 mechanical advantage over the intermediate member. Accommodating this lever arm and its related hardware may present a packaging challenge when integrating the stage into a system. Other concerns are extra mass, mechanical complexity, and additional expense.

SUMMARY OF THE INVENTION

Motivation for the proposed design is to develop a solution that maintains the desirable long travel, constant active member Y position, and intermediate member stability of a lever-arm regulated compound linear flexure bearing, but without the associated lever-arm tradeoffs. This was accomplished by making the two simple parallel flexure translation bearings of a conventional compound linear flexure bearing non-parallel to each other. This makes it impossible for them to operate in parallel. The proposed arrangement is exclusively series and positively controls the position of the intermediate member. Since it is impossible for the simple parallel flexure translation bearings to operate in parallel, this configuration will not exhibit the intermediate member instability associated with the conventional compound linear flexure bearing as shown in FIG. 6.

DETAILED DESCRIPTION OF THE INVENTION

Figure 9:
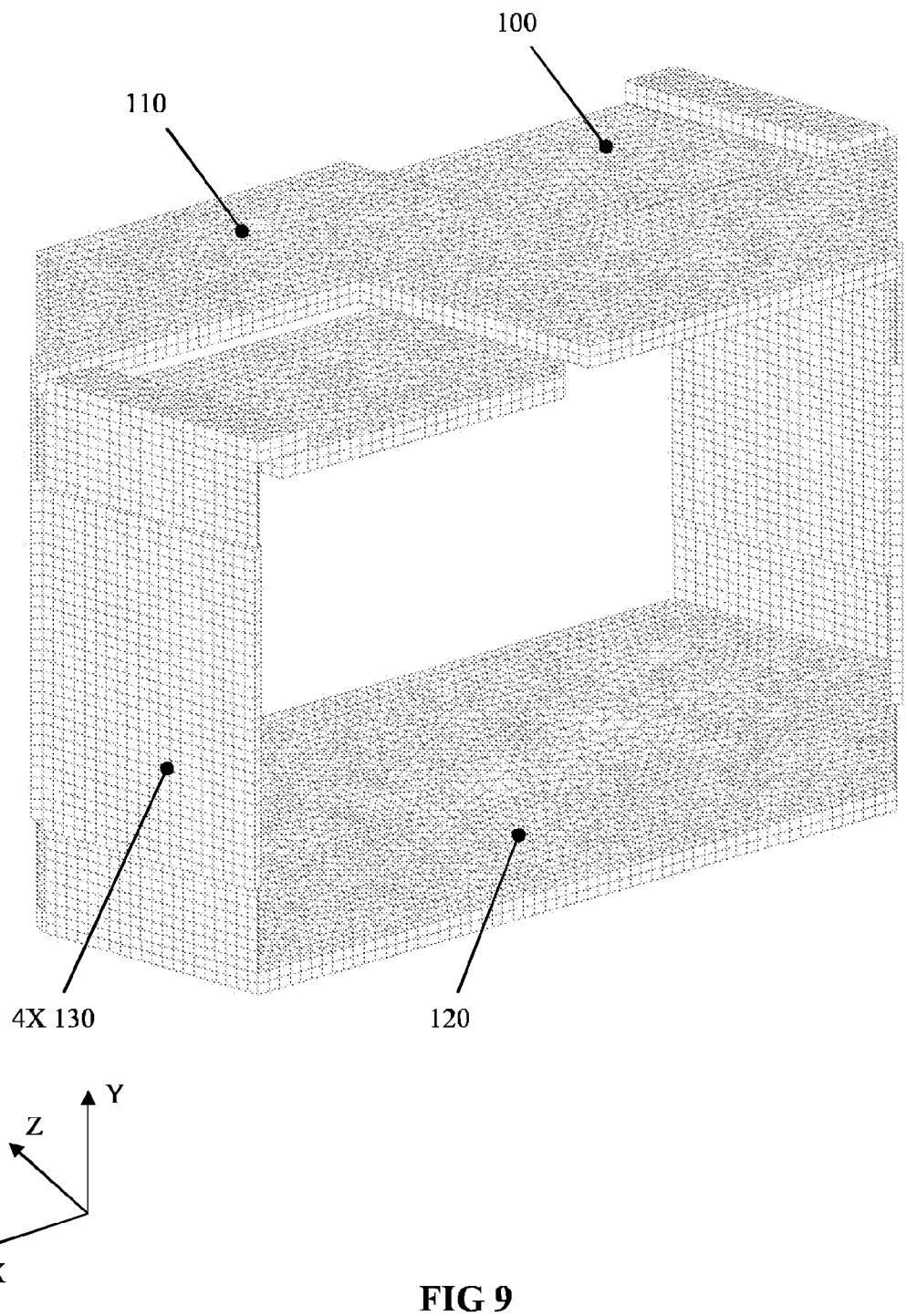
FIG. 9: Proposed linear flexure bearing concept at mid-travel.

The proposed linear flexure bearing concept is shown at mid travel in FIG. 9. It is composed of two simple parallel flexure translation bearings. The first is defined by the fixed member 100 and the intermediate member 120 connected by one pair of flexure members 130. The second is defined by the active member 110 and the intermediate member 120 connected by another pair of flexure members 130. The two simple parallel flexure translation bearings share the intermediate member. The four flexure members 130 share the same stiffness and dimensions.

Figure 10:
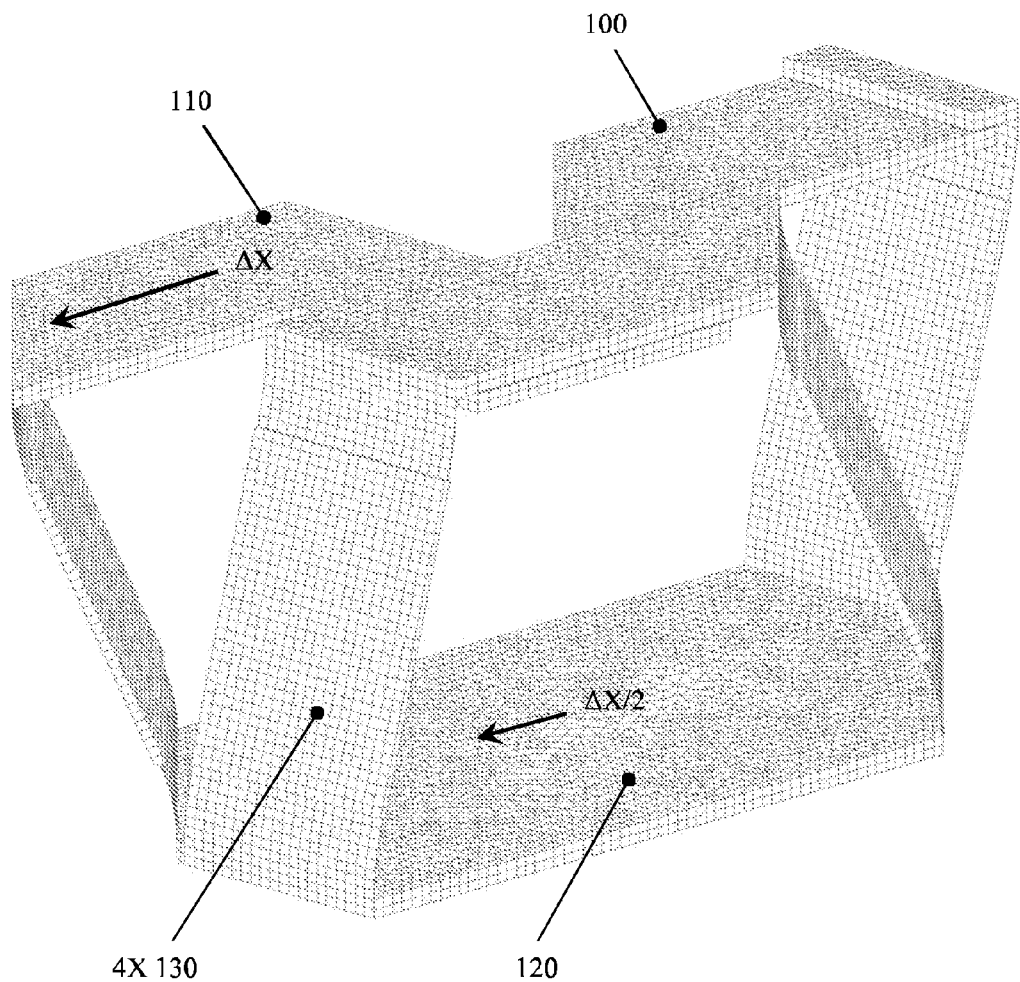
FIG. 10: Proposed linear flexure bearing concept at max-travel.
Figure 10:
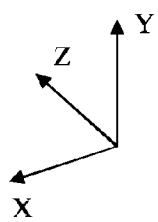

The load path is the same as in a conventional compound linear flexure bearing, so when the active member 110 is moved in the X direction the two simple parallel flexure translation bearings still operate in the same fashion, except they do not move parallel to each other as shown in FIG. 10. The flexure member pair between the fixed member 100 and intermediate member 120 guides the intermediate member 120 along a straight path at an angle of $-\theta$ to the X-axis of the compound flexure bearing. The flexure member pair between the intermediate member 120 and the active member 110 guide the active member 110 at an angle of $+\theta$ to the X-axis of the compound flexure bearing. Since the four flexure members 130 share the same dimensions, stiffness, and load, they experience the same X displacement rate of change and Y foreshortening rate of change. The two simple parallel flexure translation bearings do not translate in pure X; they each have a Z component as well. The Z displacement rate of change of the intermediate member with respect to the fixed member is equal and opposite to the Z displacement rate of change of the active member with respect to the intermediate member.

Since the four flexure members that connect the intermediate member to the fixed and active members are not parallel, it is impossible for the two simple bearings to operate in parallel. If the active member is fixed and an X load is applied to the intermediate member, the opposite pointing Z component of each simple bearing creates a binding condition that constrains the intermediate member. This inherent Z component binding condition is the feature that replaces the lever arm in a regulated compound bearing. The configuration insures constant Y and Z position of the active member at all X positions, regulates the position of the intermediate member, and is no more complex than a traditional unregulated compound bearing.

Figure 1:
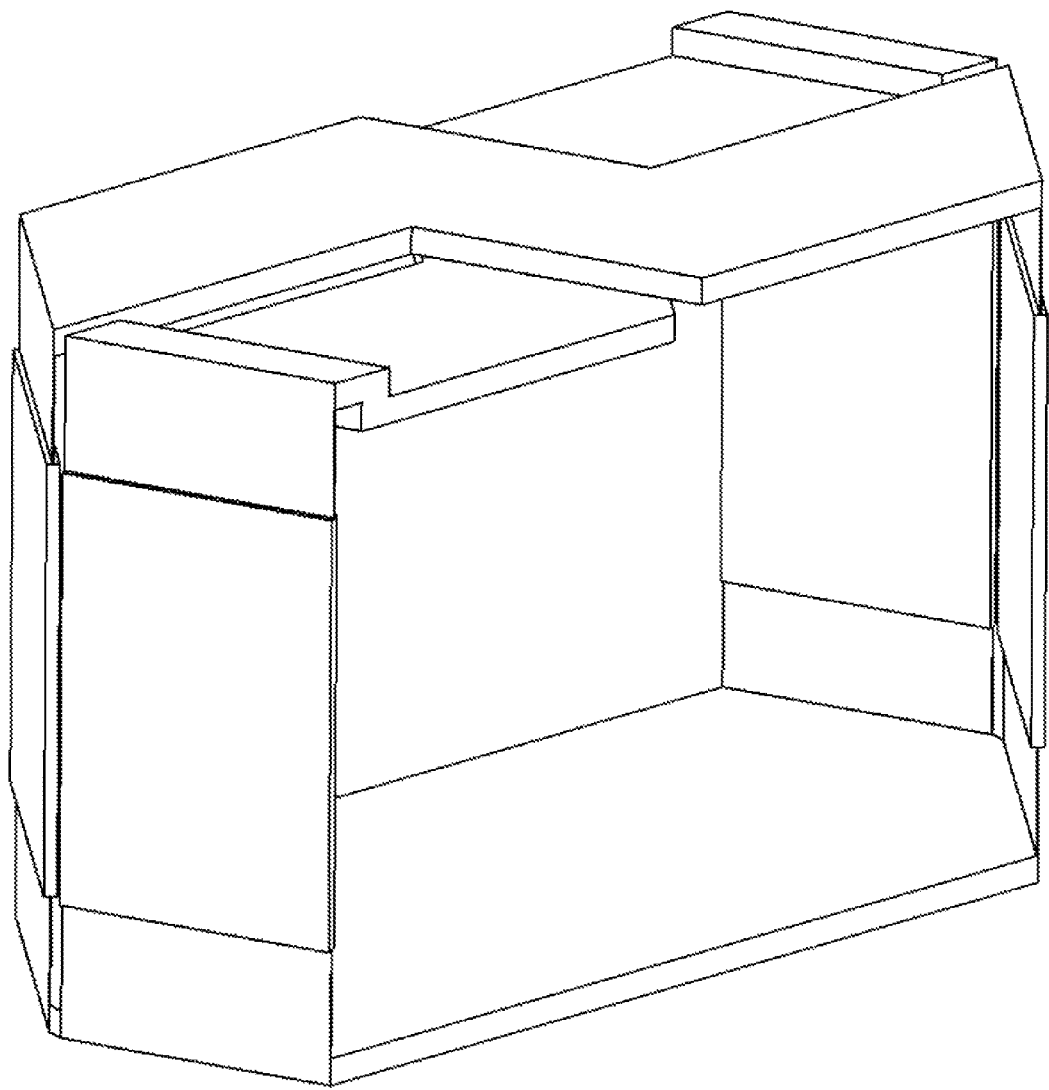
FIG. 1: Perspective view of the proposed linear flexure bearing concept.
Figure 2:
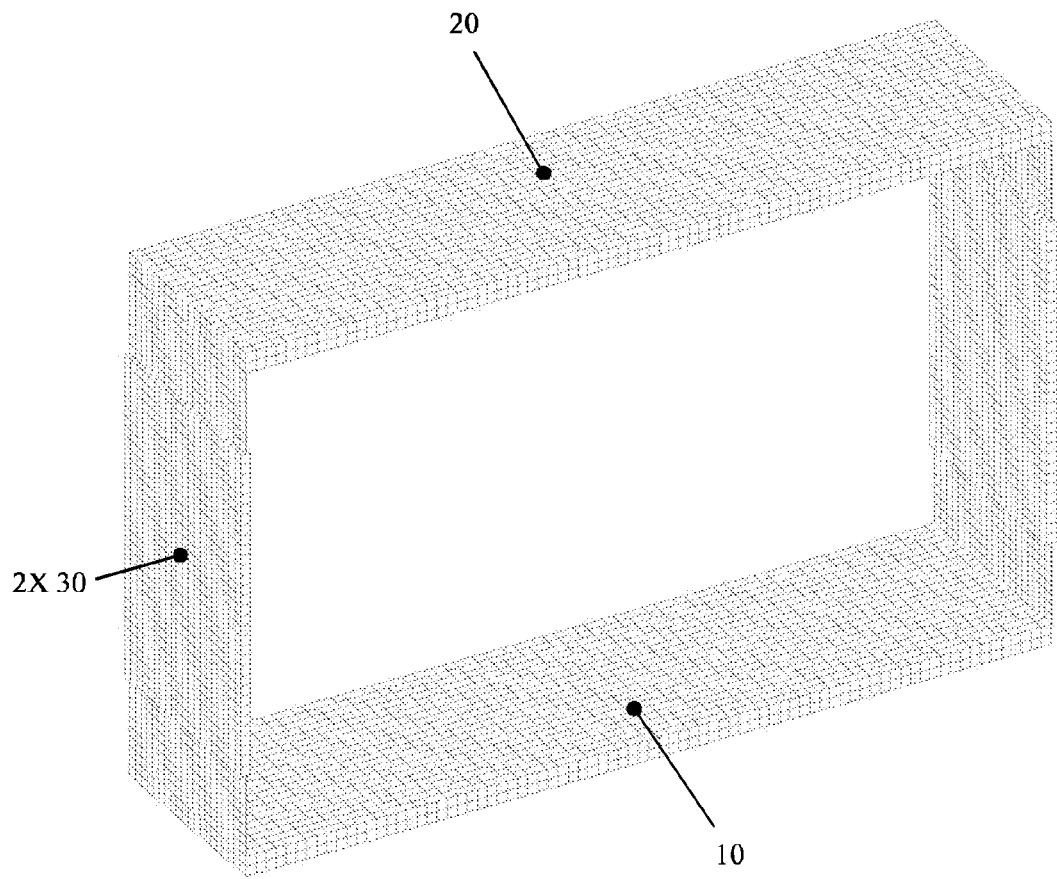
FIG. 2: Simple bearing at mid-travel.
Figure 3:
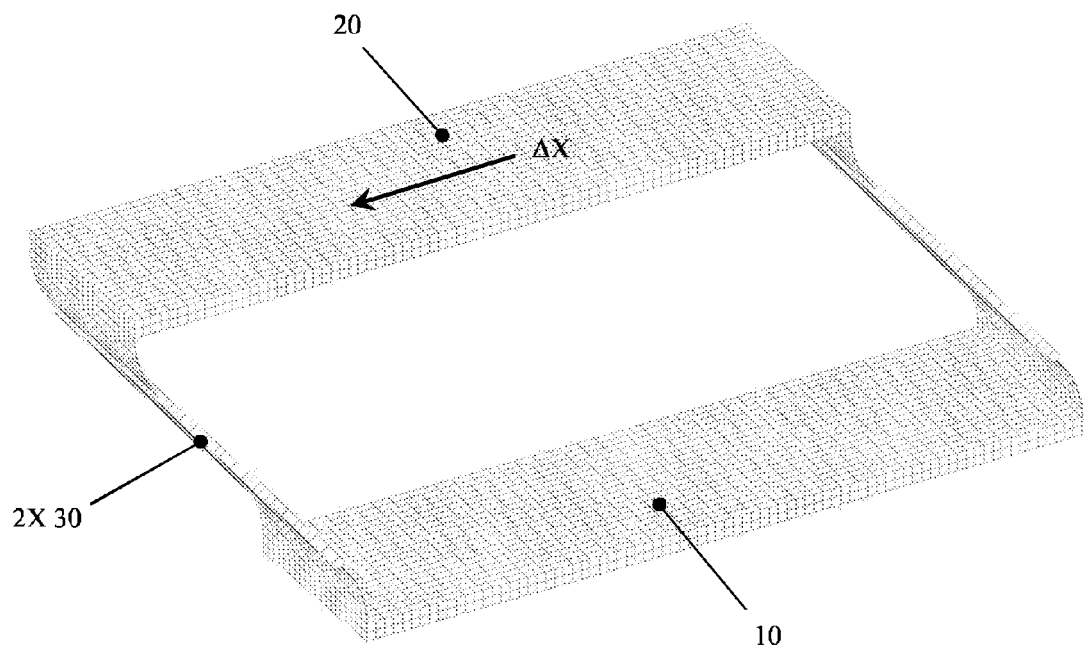
FIG. 3: Simple bearing at max-travel.
Figure 3:
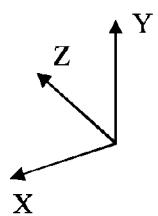
Figure 4:
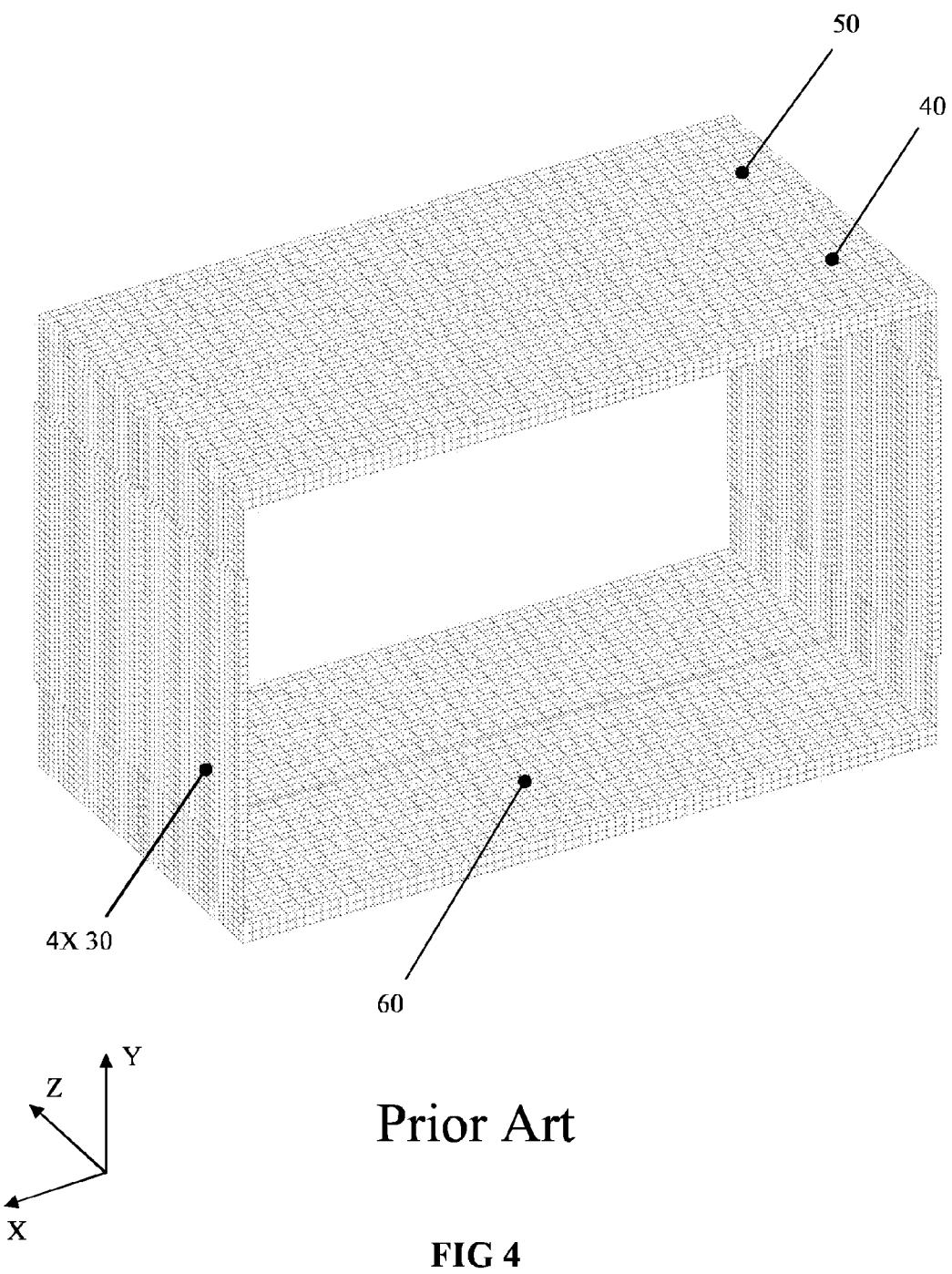
FIG. 4: Unregulated compound bearing at mid-travel.
Figure 5:
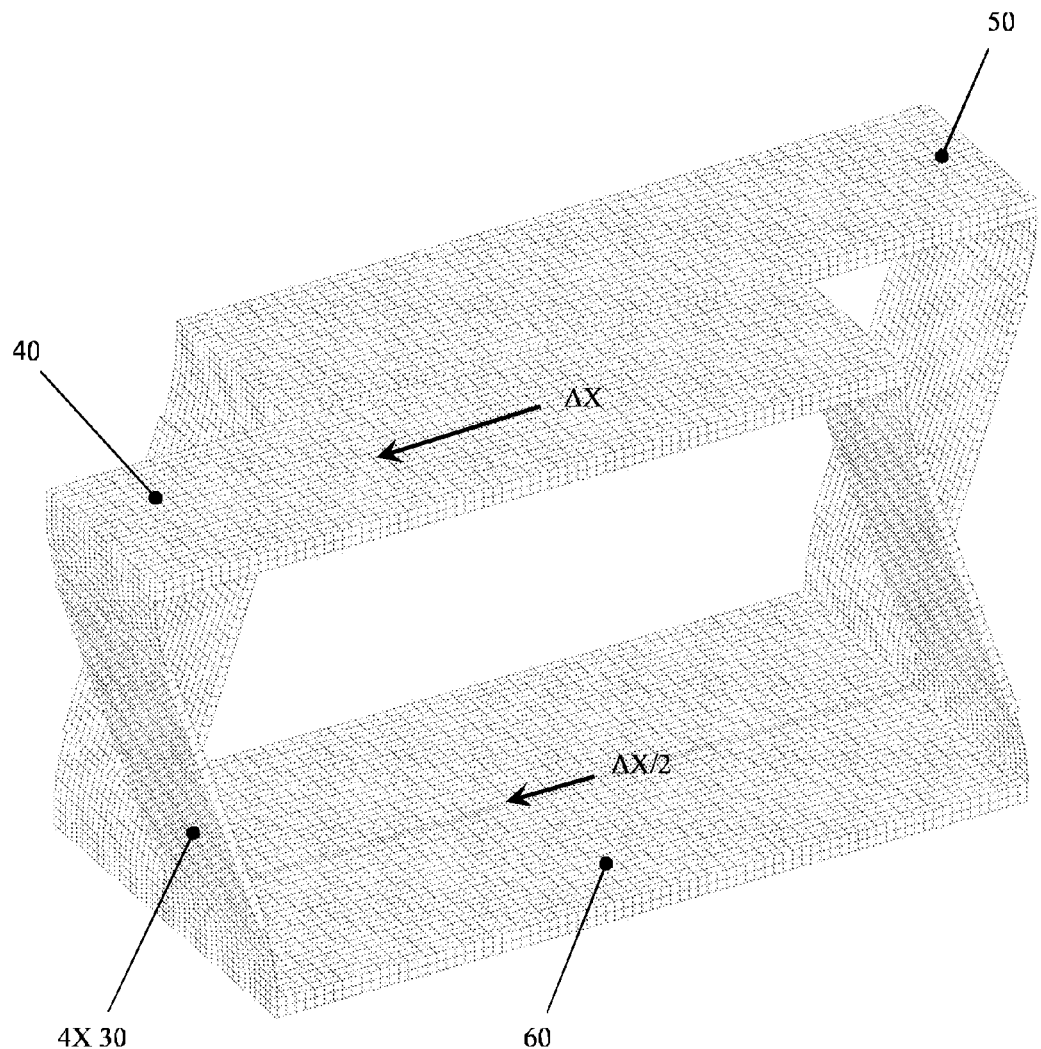
FIG. 5: Unregulated compound bearing at max-travel.
Figure 6:
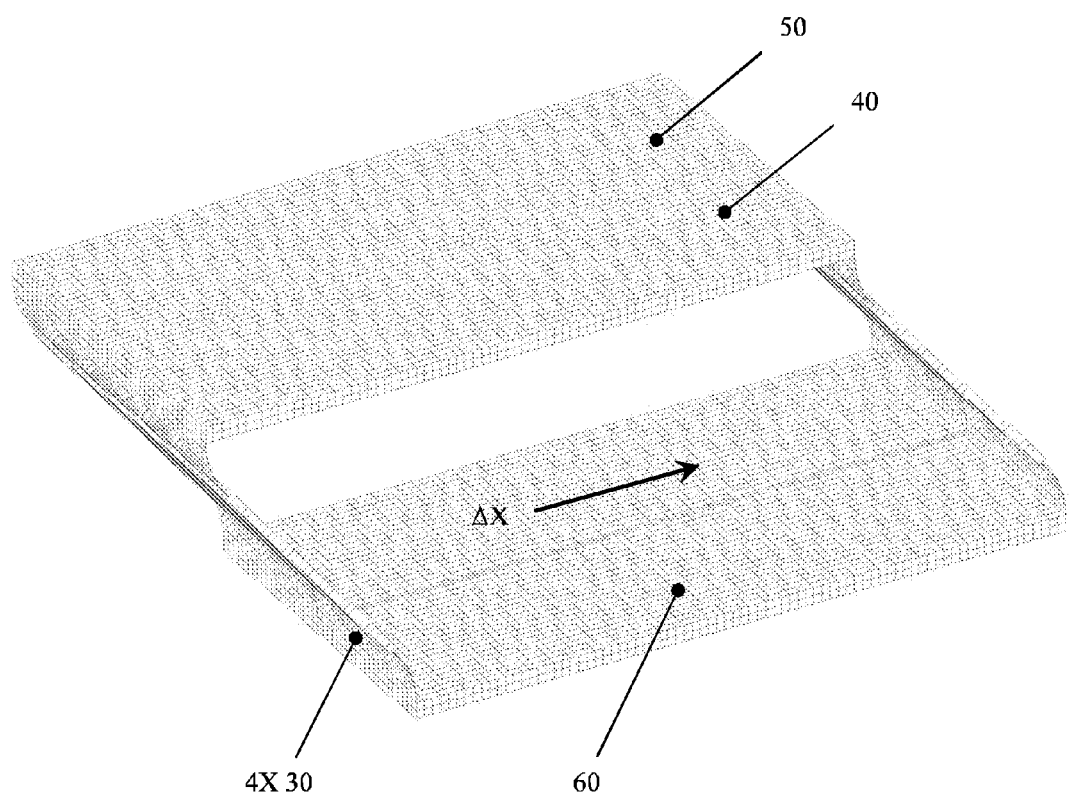
FIG. 6: Unregulated compound bearing with displaced intermediate member.
Figure 6:
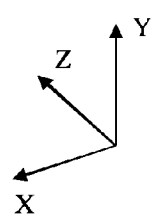
Figure 7:
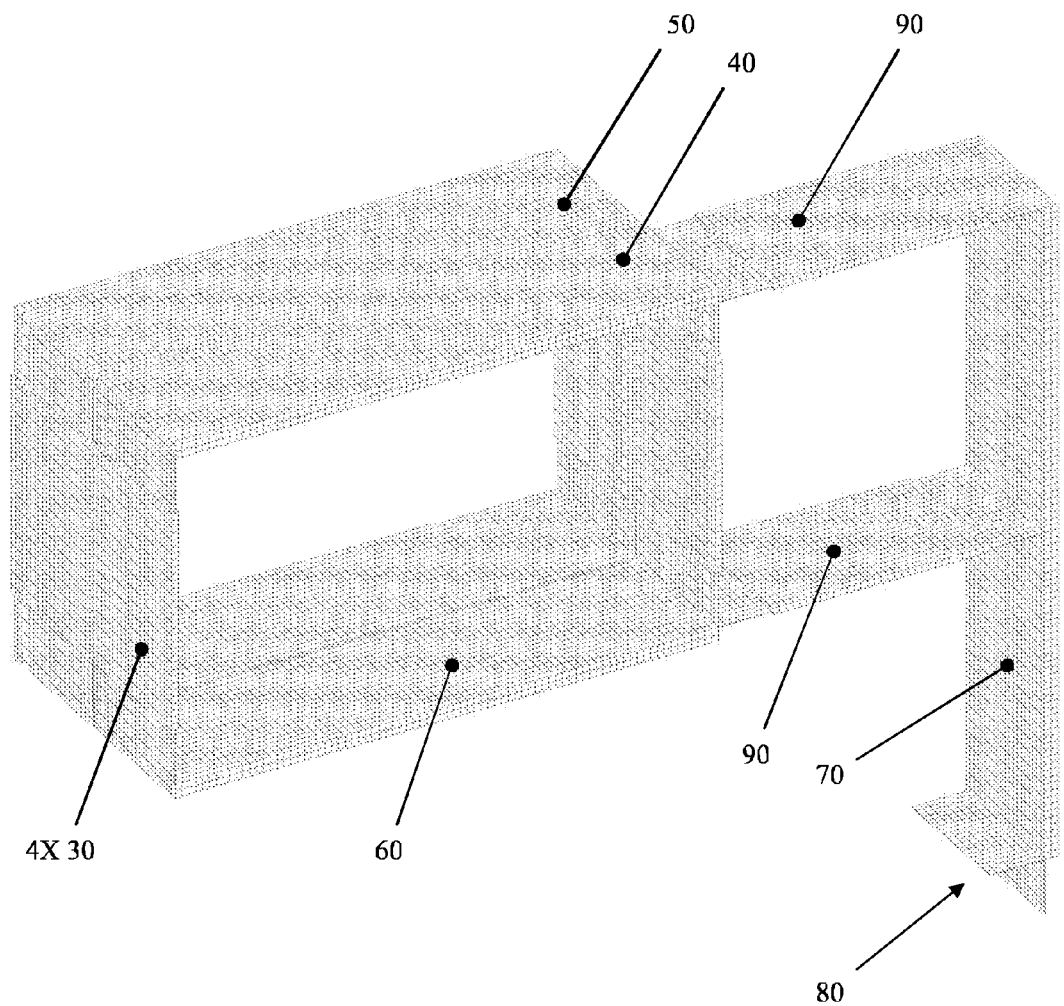
FIG. 7: Regulated compound bearing at mid-travel.
Figure 8:
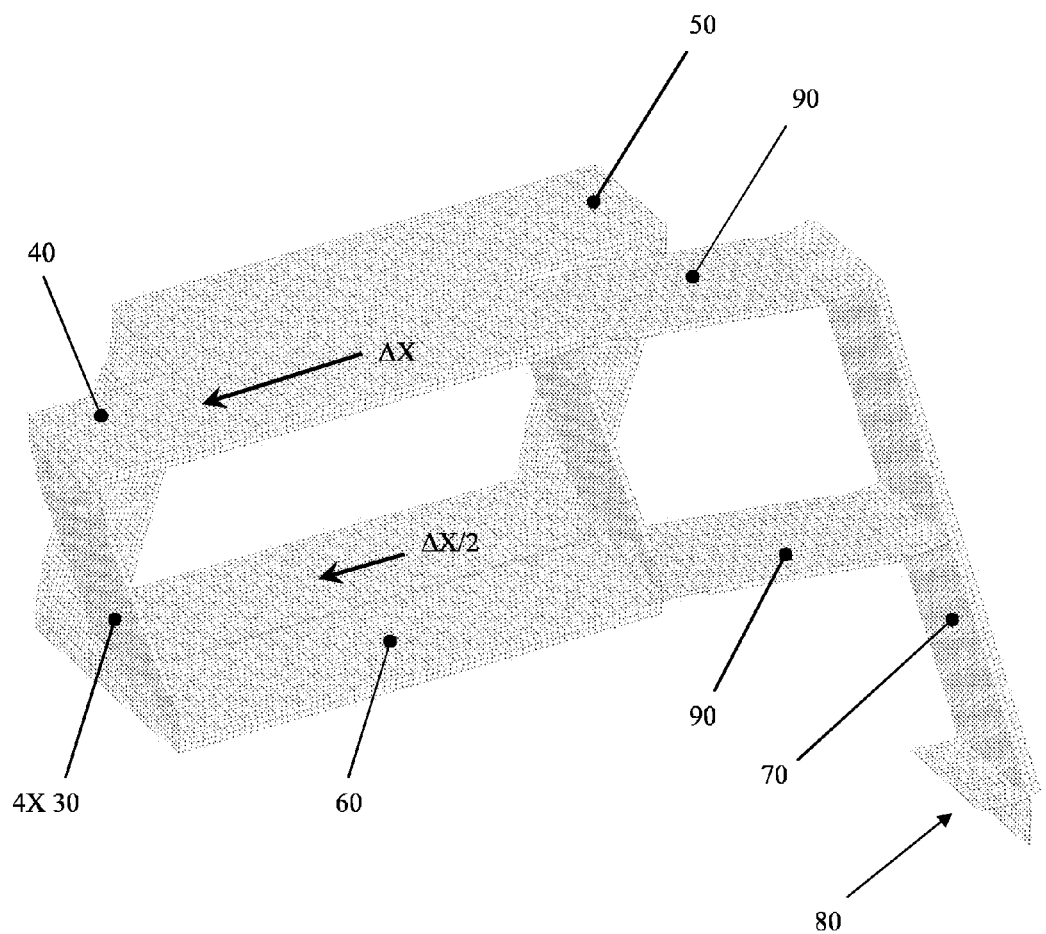
FIG. 8: Regulated compound bearing at max-travel.
Figure 8:
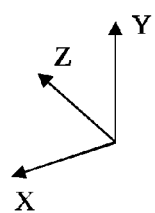
Figure 11:
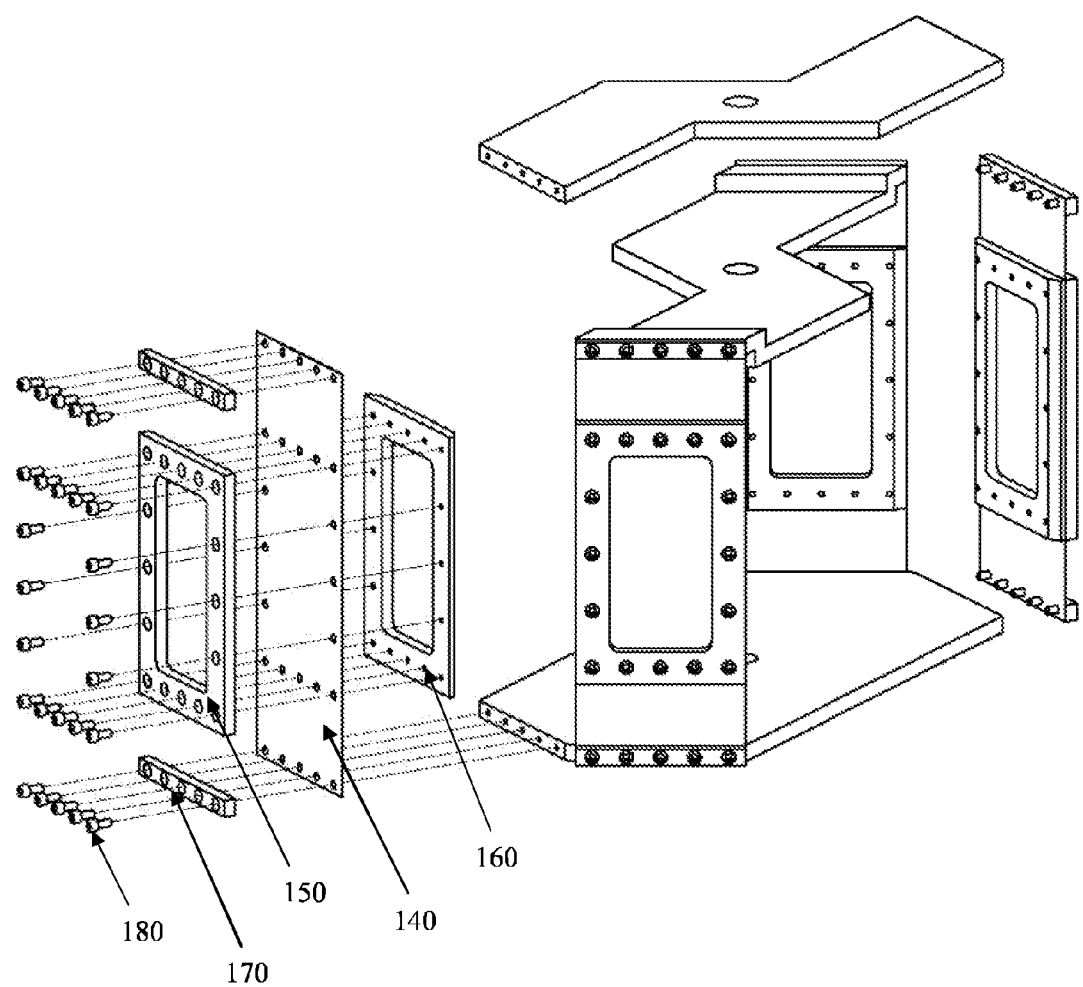
FIG. 11: Proposed linear flexure bearing exploded assembly.
Figure 12:
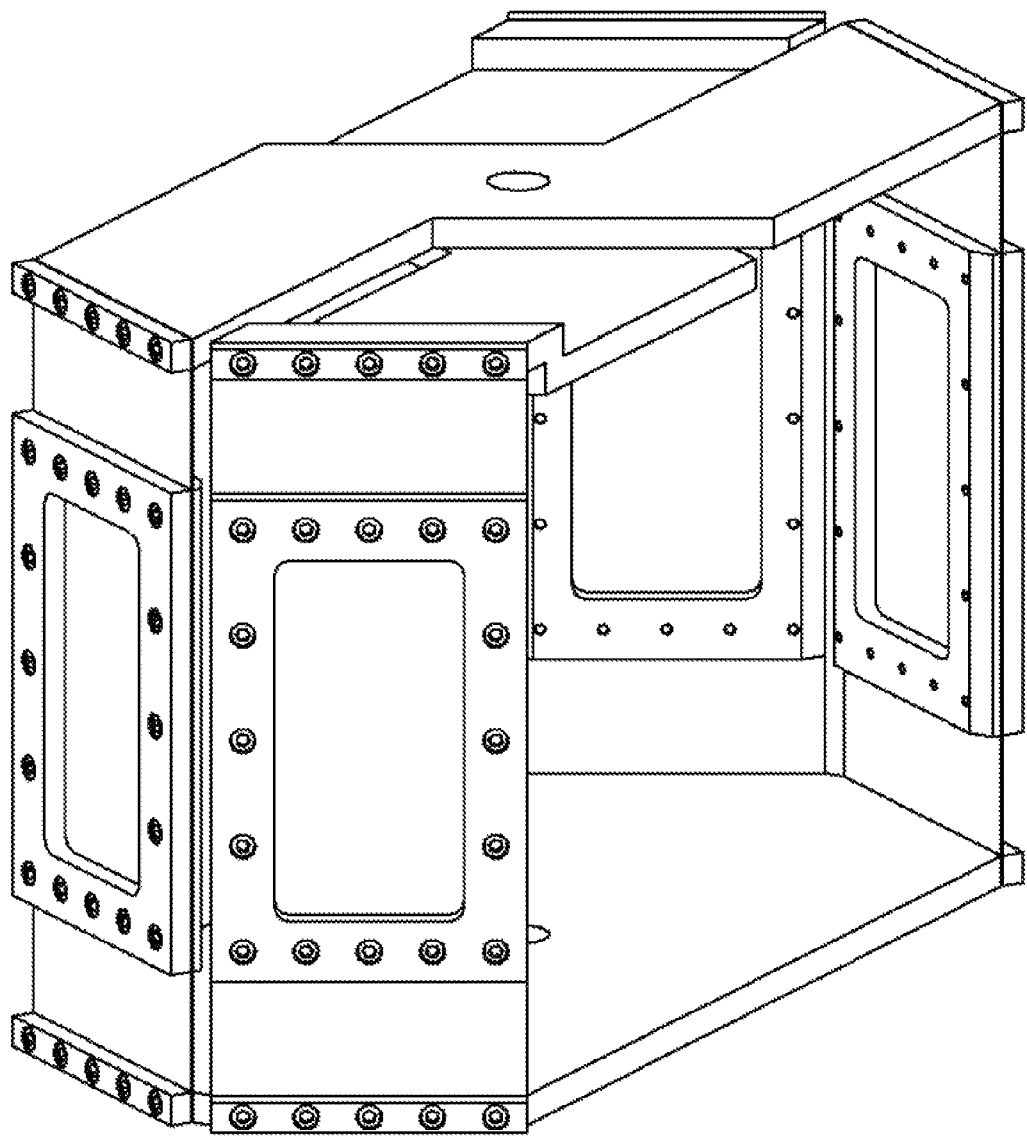
FIG. 12: Proposed linear flexure bearing assembly.

The proposed linear flexure bearing concept is illustrated in FIG. 1, FIG. 9, and FIG. 10. It is shown as a practical assembly of parts that are fastened together in FIG. 11 and FIG. 12. This simple and inexpensive fabrication approach is adequate for most applications. The individual parts are easily fabricated using conventional machining methods and can be fastened together using readily available machine screws.

Each of the four flexure members is constructed of a thin central planar member 140 which is clamped between two mid-span stiffener plates 150 and 160. Clamps 170 at each end of the central planar members are used to fasten one flexure member pair to the fixed and intermediate members, and the other pair to the active and intermediate members. Machine screws 180 are used to load the intermediate stiffener plates against the central planar member and the ends of the central planar member against the fixed, intermediate, and active members. This flexure member fabrication technique is not unique, and is not central to the successful operation of the linear flexure bearing; it is used in this description to show that a new and unique system can be created by making a small modification to an existing system. An identical linear flexure bearing could be created by using the wire EDM process to fabricate a monolithic linear flexure bearing instead of an assembly of discrete parts that are fastened together.

What is claimed as the invention is:

1. A single degree of freedom compound linear flexure bearing comprising:
   a substantially planar base intermediate member;
   a substantially planar active member being substantially parallel to the intermediate member, and spaced apart from the intermediate member, the active member being connected to the intermediate member by a first pair of planar flexure members fixed to opposite longitudinal ends of the active member and arranged substantially perpendicularly to the intermediate member and active member when at rest, the first pair of planar flexure members being substantially parallel to each other;
   a substantially planar fixed member configured to be constrained in place, the fixed member being substantially parallel to the intermediate member and spaced apart from the intermediate member, and adjacent to the active member, the fixed member being connected to the intermediate member by a second pair of planar flexure members fixed to opposite longitudinal ends of the fixed member and arranged substantially perpendicularly to the intermediate member and fixed member when at rest, the second pair of planar flexure members being parallel to each other; and
   wherein the first pair of planar flexure members are not parallel to the second pair of planar flexure members.

2. The single degree of freedom compound linear flexure bearing of claim 1 wherein the intermediate member is a planar member having a cross section with six sides, two of the six sides on a first longitudinal end converging at an acute angle and another two of the six sides on a second opposite longitudinal end converging at an acute angle, one of the first pair of planar flexure members extending from one of the two of the six sides of the first longitudinal end, the other of the first pair of flexure members extending from one of the another two of the six sides on the second longitudinal end.

3. The single degree of freedom compound linear flexure bearing of claim 2 wherein the active member is formed having one longitudinal end arranged to be parallel with the intermediate member side from which one of the first pair of planar flexure members extends; and wherein the fixed member is formed having one longitudinal end arranged to be parallel with the intermediate member side from which one of the second pair of planar flexure members extends.

4. The single degree of freedom compound linear flexure bearing of claim 1 wherein each of the first pair of planar flexure members and the second pair of planar flexure members share the same geometry and stiffness.

5. The single degree of freedom compound linear flexure bearing of claim 1 wherein the first pair of planar flexure members, the second pair of planar flexure members, the intermediate member, the active member, and the fixed member are all formed from the same piece of material, forming a seamless and continuous monolithic structure.

6. The single degree of freedom compound linear flexure bearing of claim 1 wherein one of the first pair of planar flexure members is angled towards one of the second pair of planar flexure members, and wherein the other of the first pair of planar flexure members is angled towards the other of the second pair of planar flexure members.

* * * * *